Sept. 8, 1959

W. B. LEVY ET AL 2,902,832

PIPE DRIVING TOOL ATTACHMENTS

Filed Jan. 9, 1956

Inventors:
William B. Levy
Carl I. Roehm
by Howson & Howson Attys.

Sept. 8, 1959   W. B. LEVY ET AL   2,902,832
PIPE DRIVING TOOL ATTACHMENTS
Filed Jan. 9, 1956   2 Sheets-Sheet 2

Inventors:
William B. Levy
Carl L. Roehm
by Howson & Howson Attys

United States Patent Office 2,902,832
Patented Sept. 8, 1959

2,902,832

PIPE DRIVING TOOL ATTACHMENTS

William B. Levy and Carl L. Roehm, Wilmington, Del., assignors to Delaware Tool Steel Corporation, Wilmington, Del., a corporation of Delaware Application January 9, 1956, Serial No. 557,962

2 Claims. (Cl. 61—77)

This invention relates to devices for driving pipes underground, said devices avoiding necessity for digging trenches corresponding in length to the pipe line which it may be desired to lay.

A principal object of the invention is to provide a pipe driver consisting of a combination of elements which function in conjunction with each other to meet the various requirements of underground pipe driving.

For the purpose of underground pipe driving, it has been proposed to employ a driver element adapted for operative association with conventional pneumatic hammer means and adapted, also, for operative association in hereinafter described manner with one end of a section of the pipe to be driven so as to transmit to the latter the impulses generated by the hammer and thereby to advance the pipe through the ground.

Another object of the present invention is to provide in conjunction with the said driver element and as an element of the aforesaid combination, an adapter which may be interposed between the driver element and the end of the pipe to be driven as a medium for adapting the driver element to pipes of various sizes outside of a normal capacity range.

Still another object of the invention is to provide as an essential element of the combination, a driving point adapted for application to the leading end of the driven pipe for protection of the latter during the driving operation, said point being designed relatively to the pipe so as to eliminate or reduce to a practical minimum the abrasive effects of the earth through which the pipe is driven upon the outer surface of the pipe.

Still another object of the invention is to provide a driving point adapted for use in conjunction with so called "mill wrap" pipe and formed so as to afford protection and to preclude damage to the pipe wrapping materials.

The invention contemplates further the provision as an element of the aforesaid combination of a connecting pin adapted to establish a drive connection between the terminal ends of two pipe sections so that driving impulses may be transmitted from one of said sections to another, said pin being designed to afford protection to the ends of the pipe during the driving operation.

Another object of the invention is to provide a connecting pin of the character described having provision for establishing a driving connection between two pipe sections of differing diameters, said pin being designed to facilitate the movement of the pipes through the earth in the driving operation.

The foregoing and other objects hereinafter appearing are attained by devices and structural features hereinafter described and shown in the attached drawings, wherein.

Figure 1:
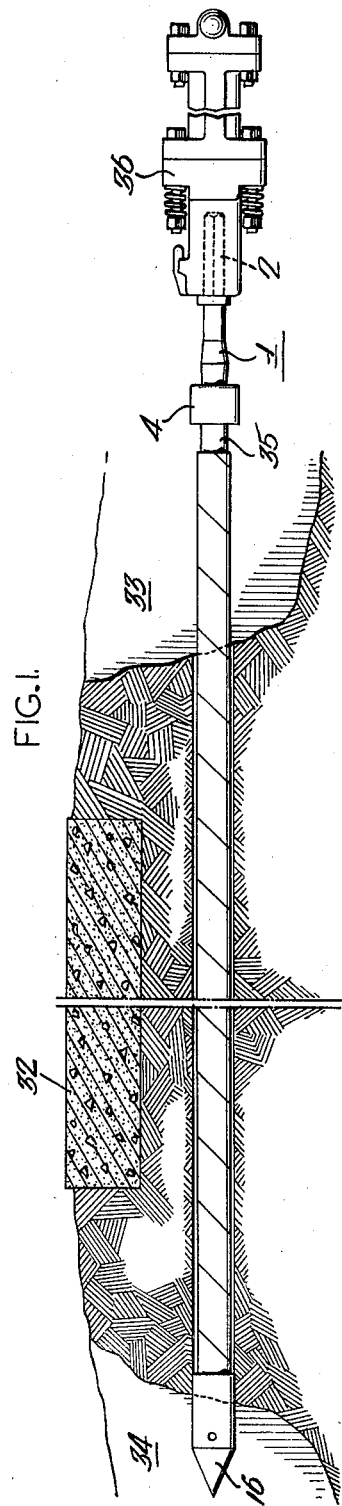
Fig. 1 is a sectional elevational view illustrating the basic driver element, the manner in which it is assembled with an air hammer of conventional form, with a driving point constituting an element of the driver combination of this invention, and with a section of pipe to be driven, and illustrating also the mode of operation of the elements in such assembly.

With reference to the drawings, the driving element aforesaid which constitutes the basic element of the combination tool of the invention is designated generally by the reference numeral 1. This element is rodlike in character, as illustrated, and has at one end a shank 2 formed for operative association and connection with a standard pneumatic hammer of the type, for example, used in road building and repair operations. The element 1 has at the other end a stem 3 for insertion in one end of the pipe to be driven; and intermediate said ends a collar 4 which is cupped axially at one end to form a socket 5 for reception of said pipe end. The bottom surface 6 of the socket, which preferably occupies a plane normal to the longitudinal axis of the driver, forms a seat for the end of the pipe, and when so seated in the socket, the pipe end is confined circumferentially between the confronting side surfaces, 7 and 8 respectively, of the stem and cup.

In the present instance, the collar 4 constitutes a separate part and comprises an inwardly tapered axially extending bore 9 which at its inner end intersects the bottom surface 6 of the socket. The tapered surface of the bore conforms to a conical surface 11 formed on the body of the driver 1, and in assembly the surface of the bore 9 seats against the conical surface 11 as illustrated, said conical portion of the driver projecting into the socket 5. It will be apparent that by reason of this interseating of the tapered bore and conical sections, the distance between the outer end of the stem 3 and the bottom 6 of the socket 5 is a fixed one.

Figure 2:
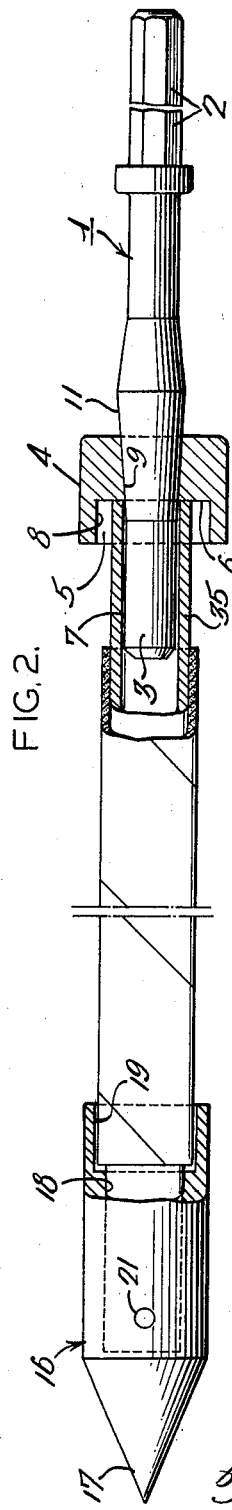
Fig. 2 is an enlarged side view partly in longitudinal section of the assembly of Fig. 1 showing the structural details of the driver and point elements.

The manner in which this driver element is associated with the pipe in the driving operation is illustrated in Fig. 2. As therein illustrated, the end of the pipe seats in the socket 5 of the collar 4. The socket is dimensioned so that either the side surface 8 of the socket will lie in close proximity to or against the outer surface of the pipe, or the side surface of the stem in the plane of the bottom 6 of the socket will occupy a corresponding relation to the inner surface of the pipe. In practice, however, the width of the socket will be such as to afford a certain latitude in the dimension of the pipe that may be inserted in the socket, but in any event, the spacing of the outer or inner diameter of the pipe from the confronting side wall of the socket, inner or outer as the case may be, will be sufficiently small to discourage any tendency of the end of the pipe to be "upset" as a result of the hammer action of the driving tool against the pipe. I have found it suitable, for example, to form the collar in the stem so that the socket will accept pipes within a range of say 1¼" to 2", or equivalent range.

Figure 3:
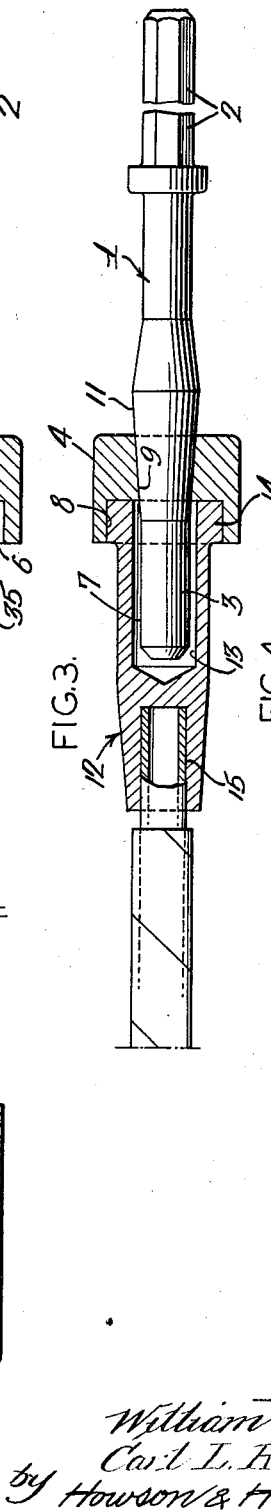
Fig. 3 is a side view partly in section showing an adapter element of the driver device and its coactive relation with the basic driver element of the combination.

In accordance with the invention, I provide in conjunction with this driver element an adapter of the form shown in Fig. 3 and indicated by the reference numeral 12. This adapter is of generally cylindrical form having at one end an axially extended socket 13 which will receive the stem of the driver element described above, the dimensions of this end of the adapter being such that it will fit nicely within the socket 5 of the driver element. The socket 13 has a depth exceeding the length of the stem portion 3 of the driver element from the outer terminal end of said stem to the seat 6 of the collar 4. so that the end surface 14 of the adapter will seat upon the said surface 6.

The opposite end of the adapter has an axially extended bore 15 which forms a socket for reception of the end of the pipe to be driven, this socket having dimensions conforming more or less closely to the outside diameter of the pipe for the purpose described above. Where this adapter is used with "mill wrap" pipe, the end of the pipe which is to be inserted in the socket 15 is bared of the outer wrapping and the socket 15 is dimensionally related as described above to the bare pipe. One or more adapters of this character will extend the utility of the device over a range of pipe sizes of considerable magnitude.

In conjunction with the driver and adapter described above, my invention provides a driving point 16 which preferably takes the form illustrated in Fig. 2. This point is of generally cylindrical form and is formed at its leading end with a conical tip 17. At the opposite end, the point is provided with an axial bore 18, the outer end of which is counterbored in the present instance as indicated at 19. The bore 18 receives the leading end of the pipe to be driven as illustrated, the end surface of the pipe seating in the bottom of the bore. Apertures 21 may be provided for reception of a pin to secure the point to the end of the pipe. The diameter of the bore preferably does not greatly exceed the outer diameter of the inserted pipe so that tendency for the end of the pipe to upset in the bore under the driving impacts will be minimized or avoided.

The counterbore 19 is provided for the purpose of adapting this point for use with pipe of "mill wrap" type. With pipe of this type, the wrap is removed from the end of the pipe to a linear extent slightly in excess of the length of the inner smaller portion of the bore 18 but less than the total length of the bore including the counterbore 19. The end of the wrap will, therefore, occupy the counterbore 19, as indicated in the drawings, so that the wrap will be embraced and protected against any possible damage by abrasive or obstructive contact with the earth through which the pipe is driven. The outer diameter of the point preferably materially exceeds the outer diameter of the wrapped portion of the pipe so that the hole drilled by the point will correspondingly exceed the wrapped pipe in diameter thereby affording sufficient clearance between the wall of the drilled passage and the outer surface of the wrapped pipe to preclude damage to the latter.

This is of considerable practical importance since with this type of pipe, it is essential that the wrapping remain intact over the entire length of the pipe. Otherwise the expense of the wrapping is offset by the existence of the unprotected area of the pipe even though the latter is of small extent. It is important also that the end of the wrap which occupies the counterbore 19 be retained in its original unmutilated state in order to facilitate the operation of joining the exposed or bare end of the pipe to the proximate end of the adjoining pipe section and the subsequent manual wrapping of the joined ends in the area in which the original mill wrap was removed.

Figure 4:
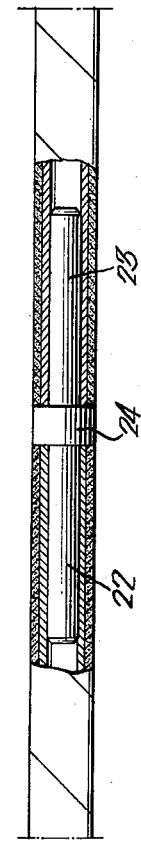
Fig. 4 is a side view partly in section showing another element of the combination tool and the manner in which it functions to establish a driving connection between the proximate ends of aligned pipe sections.
Figure 5:
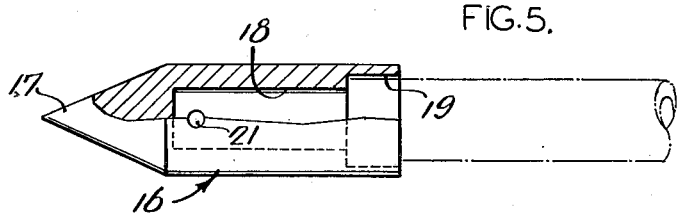
Fig. 5 is a side view partly in section of the point element.
Figure 8:
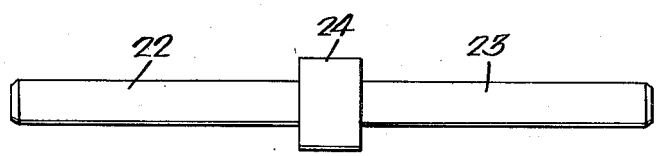
Fig. 8 is a side view of the connecting pin.
Figure 6:
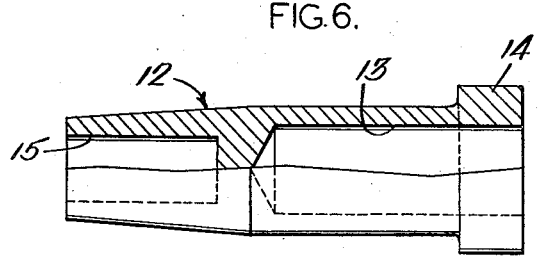
Fig. 6 is a side view partly in section of the adapter element.
Figure 7:
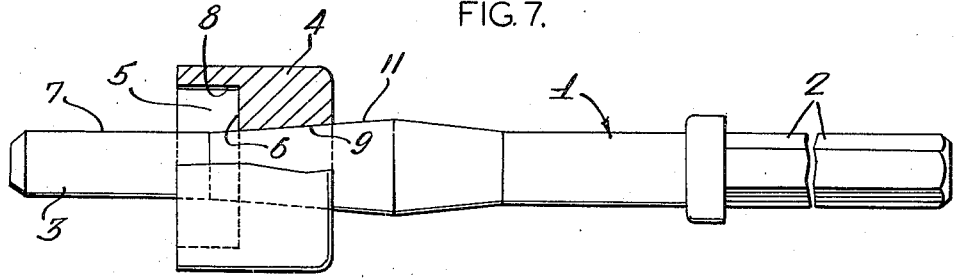
Fig. 7 is a side view partly in section of the basic driver element.

It is desirable in some instances to drive one section of pipe from another, and to this end the proximate ends of the two sections must be joined in a manner to preclude relative displacement and so that the driving impact applied to the one section may be transmitted squarely to the other. For this purpose, I provide a connecting pin of the character illustrated in Fig. 4. This pin comprises two generally cylindrical end sections, 22 and 23 respectively, which in the present instance are of the same diameter. Intermediate these end sections is a collar 24 of increased diameter which forms on its opposite end faces seats for the aforesaid pipe sections, the end portions 22 and 23 being first inserted in the pipe ends and the ends brought together so that they are separated only to the extent of the axial length of the collar 24. It will be apparent that the diameter of the collar portion 24 of this pin should be less than the outside diameter of the driving point 16 so that the same clearance will exist between the circumferential surface of the collar and the drill hole formed by advancement of the point 16 as exists between the outer surface of the pipe and the drill hole surface. Where the pin is to be used with mill wrap pipe the diameter of the collar 24 will correspond preferably to the outer diameter of the wrapped pipe.

Figure 9:
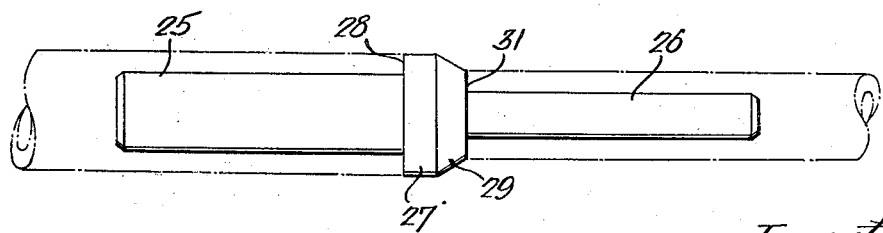
Fig. 9 is a side view of a modified form of connecting pin adapted for use in operatively connecting the ends of pipes of different diameters in inter-driving relation.

In Fig. 9, I have illustrated a connecting pin adapted for use between pipes of different sizes. In this case, the cylindrical end section 25 of the pin will fit within the pipe section of greater size, as illustrated; and portion 26 of the pin will be adapted to fit within the interior of the pipe of lesser size. The intervening collar 27 will in this case have at the side of the end portion 25 a radial face 28 of outer diameter corresponding to the outside diameter of the pipe in which the end section 25 has been inserted and which face forms a seat for the pipe end. At its opposite side, the collar 27 tapers inwardly toward the end section 26 of lesser diameter to form a truncated conical surface which terminates at its smaller end in a radial shoulder 31 having an outside diameter corresponding to the outside diameter of the pipe in which the end portion 26 is inserted. The conical surface 29 then provides an inclined transition surface extending from the outer surface of the one pipe section to the outer surface of the other. This precludes possible interference between the collar and the drill which might interfere with the free passage of the pipe through the drill bore.

The mode of the operation of the device described above is well illustrated in Fig. 1. Therein the reference numeral 32 indicates a paved road bed under which a pipe line is to be laid. The numerals 33 and 34 indicate excavations at opposite sides respectively of the road. The pipe 35 is driven from the excavation 33, and 36 is the aforesaid conventional form of pneumatic hammer which is used in the driving operation and which for that purpose is held on its side in the excavation. The tool chuck of the hammer receives the shank 2 of the driving element 1 described above, and the end of pipe 35 is seated in the socket 5 of collar 4. The opposite or leading end of the pipe, or of the leading pipe section, carries the driving point 16. At the required depth, the said leading end is entered in the wall of excavation 33, and the hammer is then actuated to drive the pipe in obvious manner until the said point has penetrated to the desired extent into the excavation 34. The pipe is thus laid without necessity for disrupting the paving of road way 32 or for interrupting normal traffic on the road, and the saving in time, labor and expense will be apparent.

I claim:

1. A pipe driver for pneumatic hammers, said driver comprising a rod-like body member having at one end a shank forming an operative connection with the hammer, a stem at the other end coaxial with the shank and having an enlarged conical section tapering toward the stem end of the body member, a collar intermediate said ends cupped axially to form a socket facing the said stem end of the body member and embracing said stem, said collar being separate from the stem and having a conical opening in the bottom wall of the cup for wedged reception of the said conical section of the stem to anchor the collar on the stem, a generally cylindrical adapter element having at one end an axially extended bore for reception of the said stem, the wall of said bore having diameter and thickness at the outer end corresponding approximately to the diameter and radial width of the said collar socket so as to fit within and to seat on the bottom of the latter, said bore exceeding in depth the length of the stem from the said socket bottom, and said adapter element having at the other end an axially extended socket for reception of the end of the pipe to be driven.

2. A pipe driver according to claim 1 wherein the pipe receiving socket conforms closely in diameter to the outside diameter of the pipe.

References Cited in the file of this patent

UNITED STATES PATENTS

| | | |
|---|---|---|
| 716,274 | Pierce | Dec. 16, 1902 |
| 1,130,076 | Eisenmenger | Mar. 2, 1915 |
| 1,188,485 | Pruyn | June 27, 1916 |
| 1,444,834 | Hindmarsh | Feb. 13, 1923 |
| 1,607,725 | Davis | Nov. 23, 1926 |
| 1,960,888 | Atwell | May 29, 1934 |
| 2,053,508 | Barney | Sept. 8, 1936 |
| 2,102,921 | Schmitt | Dec. 21, 1937 |
| 2,229,408 | Ekin | Jan. 21, 1941 |
| 2,583,965 | Page et al. | Jan. 29, 1952 |
| 2,802,340 | Tallman | Aug. 13, 1957 |

FOREIGN PATENTS

| | | |
|---|---|---|
| 228,491 | Switzerland | Nov. 16, 1943 |